United States Patent
Bruckner

(10) Patent No.: US 10,069,735 B2
(45) Date of Patent: Sep. 4, 2018

(54) METHOD FOR DATA COMMUNICATION WITH REDUCED OVERHEAD IN A REAL-TIME CAPABLE ETHERNET DATA NETWORK

(71) Applicant: B&R INDUSTRIAL AUTOMATION GMBH, Eggelsberg (AT)

(72) Inventor: Dietmar Bruckner, Anthering (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 43 days.

(21) Appl. No.: 15/281,810

(22) Filed: Sep. 30, 2016

(65) Prior Publication Data

US 2017/0099223 A1  Apr. 6, 2017

(30) Foreign Application Priority Data

Oct. 1, 2015  (AT) ............................... A 50833/2015

(51) Int. Cl.
*H04W 4/00* (2018.01)
*H04L 12/801* (2013.01)
*H04L 29/06* (2006.01)
*H04L 29/08* (2006.01)
*H04L 29/12* (2006.01)

(52) U.S. Cl.
CPC .............. *H04L 47/12* (2013.01); *H04L 69/22* (2013.01); *H04L 61/6022* (2013.01); *H04L 69/16* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 5,214,647 A | 5/1993 | Komatsu | |
| 2004/0243684 A1* | 12/2004 | Ha | H04B 3/542 709/208 |
| 2007/0109989 A1* | 5/2007 | Nakagawa | H04W 84/20 370/328 |

(Continued)

FOREIGN PATENT DOCUMENTS

EP  0 963 078  12/1999

OTHER PUBLICATIONS

Austria Search Report conducted in counterpart Austria Appln. A 50833/2015 (dated Sep. 13, 2016).

*Primary Examiner* — Phirin Sam
(74) *Attorney, Agent, or Firm* — Greenblum & Bernstein, P.L.C.

(57) ABSTRACT

In order that in a real-time capable Ethernet data network protocol the cycle time of the transmission cycles in a real-time capable Ethernet data network can be shortened, according to the invention a plurality of slaves (S1, S2, S3, S4, S5) is combined into a sum frame group (SG) and a slave (S2, S4) of the sum frame group (SG) is specified as collector node (SK) and all other slaves (S1, S2, S3, S4, S5) of the sum frame group (SK) transmit their data in each case with a collective data packet (DPS1, DPS2, DPS3, DPS4, DPS5) to the collector node (SK) transmit, the collector node (SK) inserts the data of the other slaves (S1, S2, S3, S4, S5) of the sum frame group (SG) into a sum frame data packet (DPSR) and the collector node (SK) transmits the sum frame data packet (DPSR) to the master (M).

5 Claims, 5 Drawing Sheets

(56) References Cited

U.S. PATENT DOCUMENTS

Figure 1:
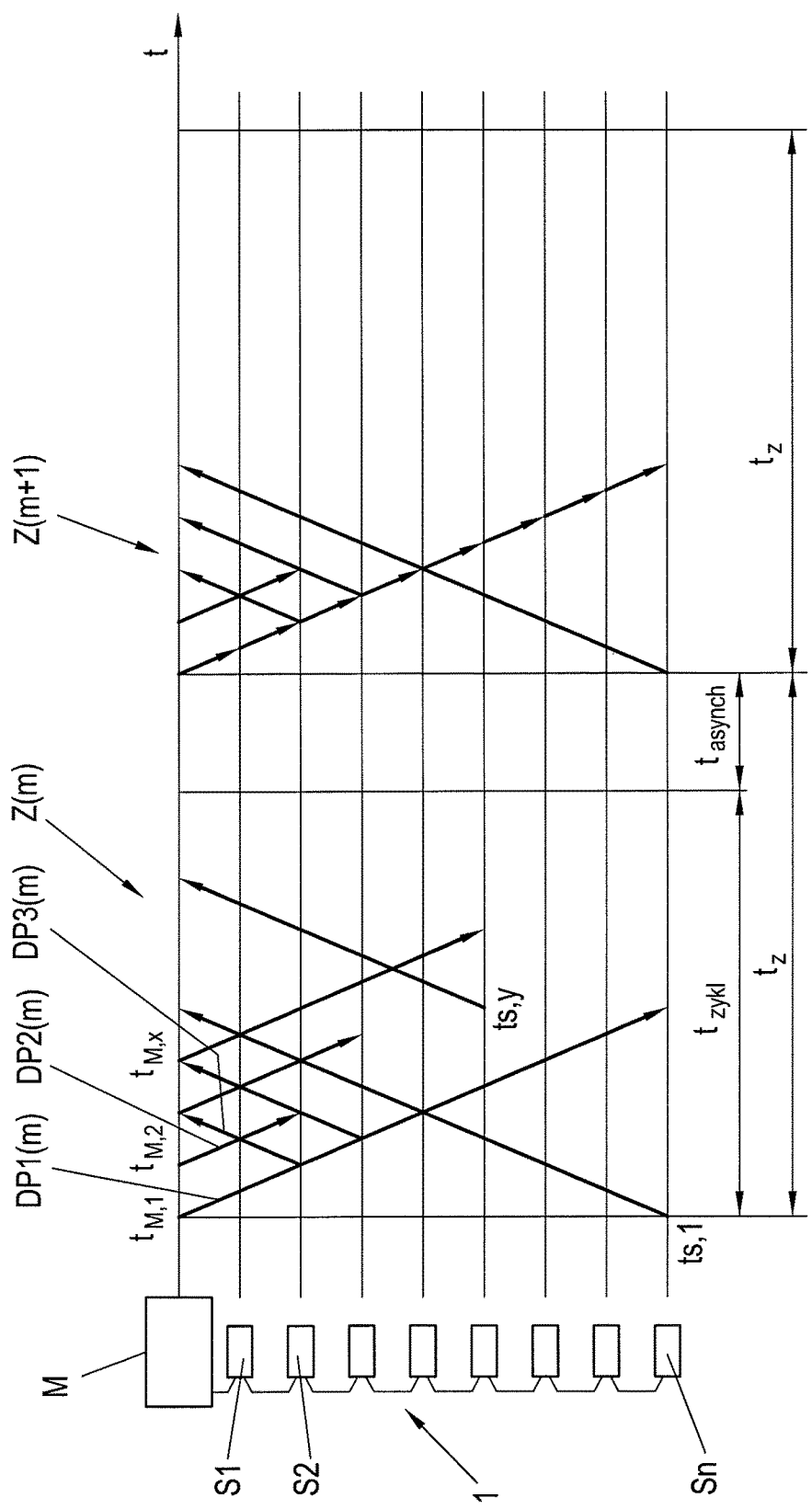

| | | | |
|---|---|---|---|
| 2007/0230462 A1* | 10/2007 | Nakayama | H04L 12/403 370/389 |
| 2008/0089361 A1* | 4/2008 | Metcalf | H04L 12/403 370/474 |
| 2008/0151801 A1* | 6/2008 | Mizuta | H04W 52/343 370/311 |
| 2009/0222606 A1* | 9/2009 | Janssen | H04L 12/437 710/110 |
| 2016/0034417 A1* | 2/2016 | Chavez | G06F 13/4282 710/110 |

\* cited by examiner

METHOD FOR DATA COMMUNICATION WITH REDUCED OVERHEAD IN A REAL-TIME CAPABLE ETHERNET DATA NETWORK

This application claims priority under 35 U.S.C. § 119(a) of Austrian Application No. A50833/2015 filed Oct. 1, 2015, the disclosure of which is expressly incorporated by reference herein in its entirety The present invention relates to a method for data communication in a real-time capable Ethernet data network, in which at least one master is connected by means of the Ethernet data network to a plurality of slaves and data in the form of data packets are transmitted between the master and the slaves.

In a data network for data communication, a network protocol is implemented, with which data is transferred in data packets in the data network between the network nodes which are connected to the data network. Probably the best known and most widespread network protocol is the Ethernet protocol. Hereto, Ethernet defines data packets (also called data frame or Ethernet frame), in which data of a higher-level communication protocol can be transferred encapsulated in an Ethernet data packet. In doing so, data of the communication protocol can be transferred in an Ethernet data packet with a data length between 46 and 1500 bytes. Addressing in the Ethernet protocol is effected by means of MAC (Media Access Control) addresses of the network nodes which are clearly allocated for every network device. As seen from the perspective of the known OSI model, Ethernet is exclusively implemented on layers 1 and 2. In the higher layers, different communication protocols can be implemented. Hereby, a multiplicity of communication protocols has been established, for example IP in layer 3 or TCP and UDP in layer 4 to name but a few of the most widespread communication protocols.

With regard to hardware, today's Ethernet systems are so-called switched data networks, in which individual network nodes do not have to be connected with one another and do not have to be able to communicate with one another, but can instead be connected by means of coupling elements, so called switches or network hubs. For such purpose, a coupling element has a number of network ports for the option of connecting a network participant (either a network node or a different coupling element). Such a coupling element forwards an Ethernet data packet either to all ports (hub) or to (one) specific port(s) (switch). Thus, so-called point-to-point connections are created in a switched data network, in which Ethernet data packets are forwarded from one network node to a different network node by means of a number of coupling elements.

Network nodes which are used in the industrial automation often have a built-in internal 3-port switch, wherein two ports are accessible from outside and the third port serves the internal interconnection. As a result, without additional external coupling elements, line topologies can be realized, in which a network node is connected to the next adjacent network node in the form of a line, which is advantageous in an industrial environment for reducing the cabling effort. However, it is self-evident that external network switches or external network hubs can also be used for the setup of the network topology. Basically, any network topology is possible, i.e. particularly a star topology, a line topology, a tree topology, a ring topology, etc. as well as any combination thereof. As a rule, a ring topology, as is known in general, requires specific precautions in order to prevent the uncontrolled circulation of multiple-address data packets.

In order to be able to also use Ethernet for industrial automation, real-time capable Ethernet protocols have already been developed because the standard Ethernet protocol is known to not be real-time capable. Examples of known real-time capable Ethernet network protocols are Modbus/TCP, Ethernet/IP, ProfiNET IRT, EtherCAT, or Ethernet POWERLINK, to name but a few. In this context, often also the term industrial Ethernet is used. These real-time capable Ethernet protocols are supposed to ensure data communication that is sufficiently fast and deterministic for the corresponding application. They are thus supposed to ensure that a real-time relevant data packet is transferred via the network within a predetermined interval from a transmitting network node to a receiving network node. In an industrial automation environment, real-time capability means, e.g. that a fixed interval must be observed between the acquisition of a measured value, transfer of the measured value to a control unit, calculation of an actuating value in the control unit based on the measured value, and transfer of the actuating value to an actuator for executing an operation. With reference to the real-time capable Ethernet data network for transferring these data via the real-time capable Ethernet data network a predetermined interval of the data transmission must be ensured.

In an industrial automation environment, there is generally as least one master network node (hereinafter also called master for short) which communicates with at least one associated, but usually a plurality of associated slave network nodes (hereinafter also called slaves for short). For realizing a real-time capable Ethernet data network, the known real-time capable Ethernet network protocols have defined a transmission cycle having a predefined cycle time, within which the master can communicate with each slave. This normally comprises cyclically the possibility of a data packet from the master to every slave and conversely also at least one data packet from a slave, normally at least one data packet from each slave to the associated master. The attainable and beforehand ascertainable minimal cycle time results from the sum of the maximum run times of the data packets. The run times are hardware-dependent and result from bit transmission times (length, payload) of the data packets, network infrastructure (e.g. delays due to coupling elements), and the network topology. The above-mentioned limits regarding the size of the Ethernet data packets must also be taken into account.

This cyclical (isochronous) data traffic, which constitutes the basis of the real-time capability in the real-time capable Ethernet network protocol, is usually expanded in each transmission cycle by non-cyclical (asynchronous) data packets. Such asynchronous data packets are used by the data communication which is not subject to the real-time requirements, for example for configuration of the slaves, for visualization purposes or for status enquiries. Bandwidth is reserved for such asynchronous data packets, i.e. a specific, defined time is available in each transmission cycle for asynchronous data traffic. The known real-time capable Ethernet protocols differ in the specific implementation of the cyclical and asynchronous data traffic.

Real-time capable Ethernet data network are increasingly large, in the sense that ever more network nodes are incorporated into the data network. The bandwidth available in the data network for the data communication must therefore be well planned, in order to keep the achievable transmission times low for real-time applications.

However, the bandwidth is occupied by many very short data packets. The smallest Ethernet data packet contains 46 bytes of data. If the usage data to be transmitted are shorter, the data packets must be filled, generally with zeros (the so-called frame padding with padding data). However, in a real-time capable Ethernet data network the slaves (e.g. sensors, input/output devices, transmitters, etc.) often transmit only a small amount of data (in the sense of a small data length) to the master (e.g. a control unit), so that a substantial amount of bandwidth on the data network is wasted by these short data packets.

In order to be able to better utilize the available bandwidth so-called sum frames have already been used in which data for or of a plurality of network nodes are contained. In this way savings can be made on overhead, and possibly padding data, of many smaller data packets, whereby the bandwidth can be utilized better and the cycle time can be shortened. EtherCAT, for example, uses a sum frame method, in which the master sends a data packet with data for all slaves to the first slave. This latter reads its data out of the data packet (output data) and overwrites these data with data which the slave wishes to transmit to the master (input data). This modified data packet is then transmitted to the second slave, etc., until in the reverse sequence the data packet from the last slave is again transmitted to the master. The disadvantage of this is that the reserved data in the sum frame per slave must always be as great as the maximum of input and output data of each slave, which reduces the available bandwidth. Furthermore, EtherCAT needs dedicated components (ASIC) in the network node, since this method does not work with standard Ethernet hardware. In another known implementation of the sum frame method the data packet is curtailed in the direction from the master to the slave, and each slave takes its data from the data packet and lengthens it in the reverse direction, as each slave adds its data to the data packet on the master. A disadvantage of such a sum frame method is that the data packet has a different length at each location in the data network and so the data network is difficult to diagnose. Apart from this, here too dedicated components must also be employed in the network nodes for implementation. Such a sum frame method is supported by ProfiNet IRT (dynamic frame packing). POWERLINK sends a data packet from the master as sum frame to all slaves and the master receives a separate Ethernet data packet back from each slave. This method can be implemented with standard Ethernet hardware, because the sum frame is generated once in the master and thereafter is not changed by any other network nodes. However, the known methods are all based on the master initiating the data communication.

With this method an improvement could already be achieved in the utilization of the available bandwidth on the real-time capable Ethernet data network. In other words, more data can be transmitted per unit of time, or the cycle times of the transmission cycles could be shortened.

It is an object of the present invention to provide a method by which with limited expenditure the cycle time of the transmission cycles can be shortened in a real-time capable Ethernet data network.

This object is achieved according to the invention in that a plurality of slaves is combined in a sum frame group and a slave of the sum frame group is specified as the collector node and all other slaves of the sum frame group transmit their data with collective data packets to the collector node, the collector node inserts the data of the other slaves of the sum frame group into a sum frame data packet and the collector node transmits the sum frame data packet to the master. This sum frame method does not have to be initiated by the master, in form of transmitting a sum frame by the master to the slaves, wherein the slaves process this sum frame in any way. Therefore, by this sum frame method the slaves which transmit to the collector nodes can be implemented as conventional Ethernet network nodes without additional functionality. The collector node must merely have implemented the additional functionality of collecting the collective data packet and producing and transmitting the sum frame data packet to the master M. In this way the expenditure for implementation of the sum frame method can be significantly reduced and nevertheless short cycle times can be achieved.

It is especially advantageous if the slave of the sum frame group which is furthest from the master in the data network is selected as collector node. Thus it is possible to exploit the fact that in a conventional real-time capable Ethernet data network less data is transmitted from the master to the slave than in the reverse direction. Thus the transmission direction in which less data traffic takes place is utilized in order to transmit the collective data packet, which does not burden the data network. Then with the advantages of the sum frame the data can be transmitted as a sum frame in the direction of the master.

Alternatively, the slave of the sum frame group which is arranged closest to the master on the data network can be selected as collector node. In this way the network nodes which are further from the master can transmit at a lower data rate than the collector node, so that network node, so that network nodes with different data rates can be used.

When a slave in the middle of the sum frame group is selected as collector node, both advantages can be used.

Figure 2:
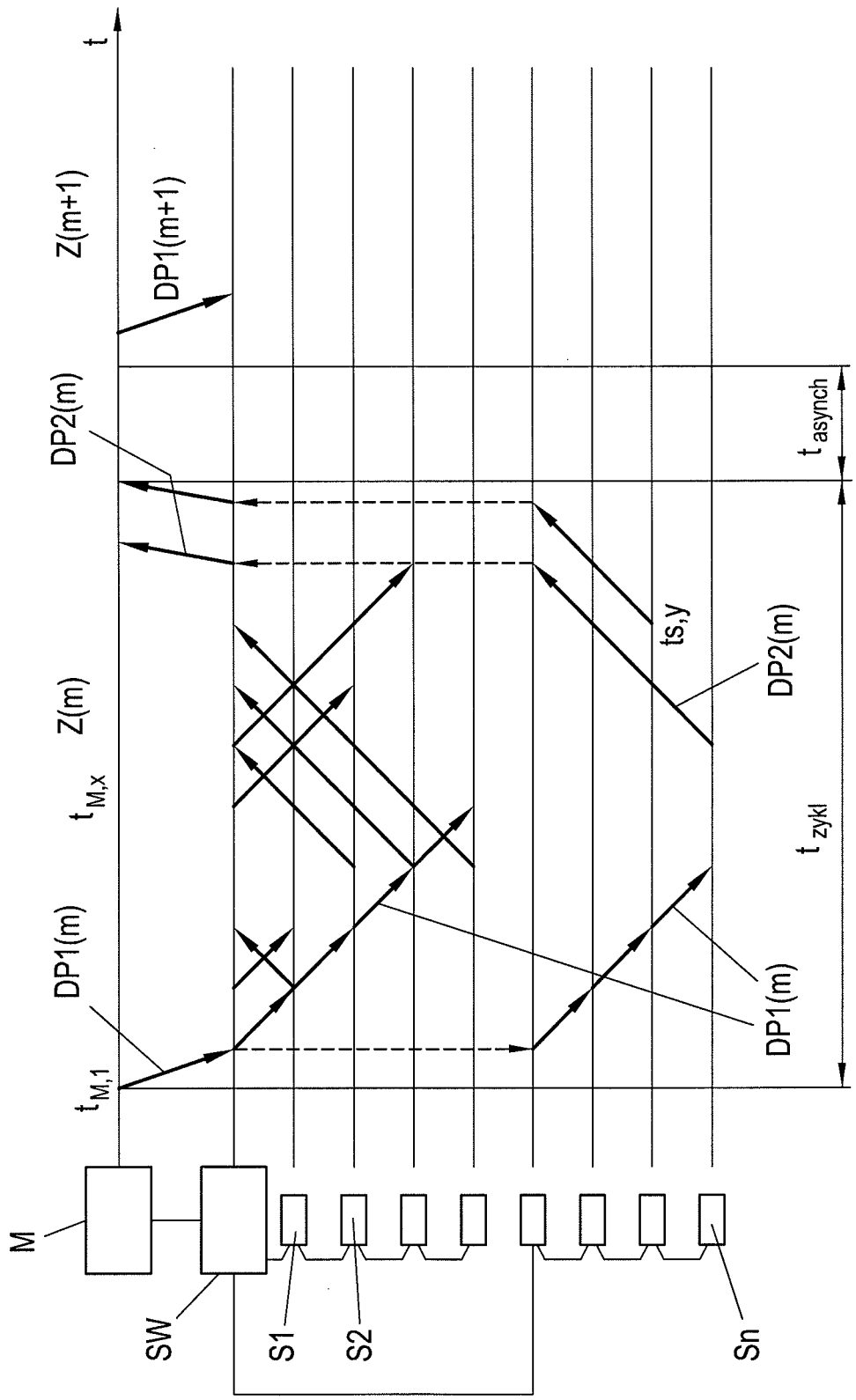
Figure 3:
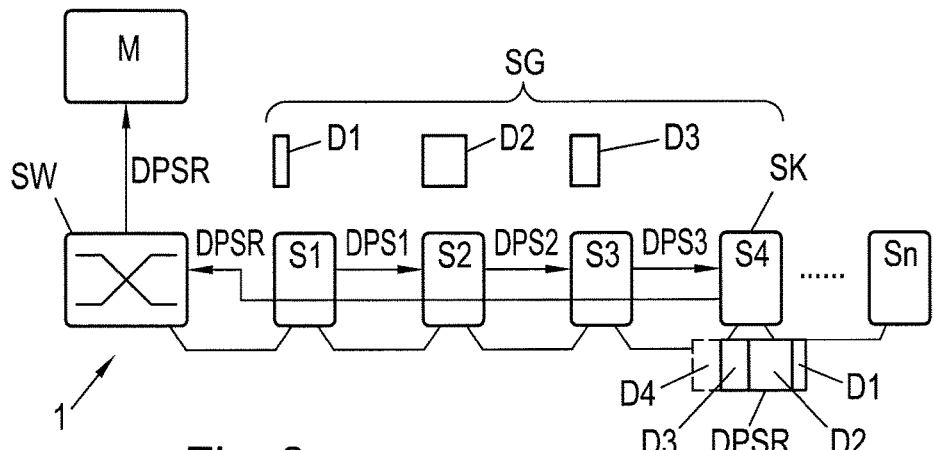
Figure 4:
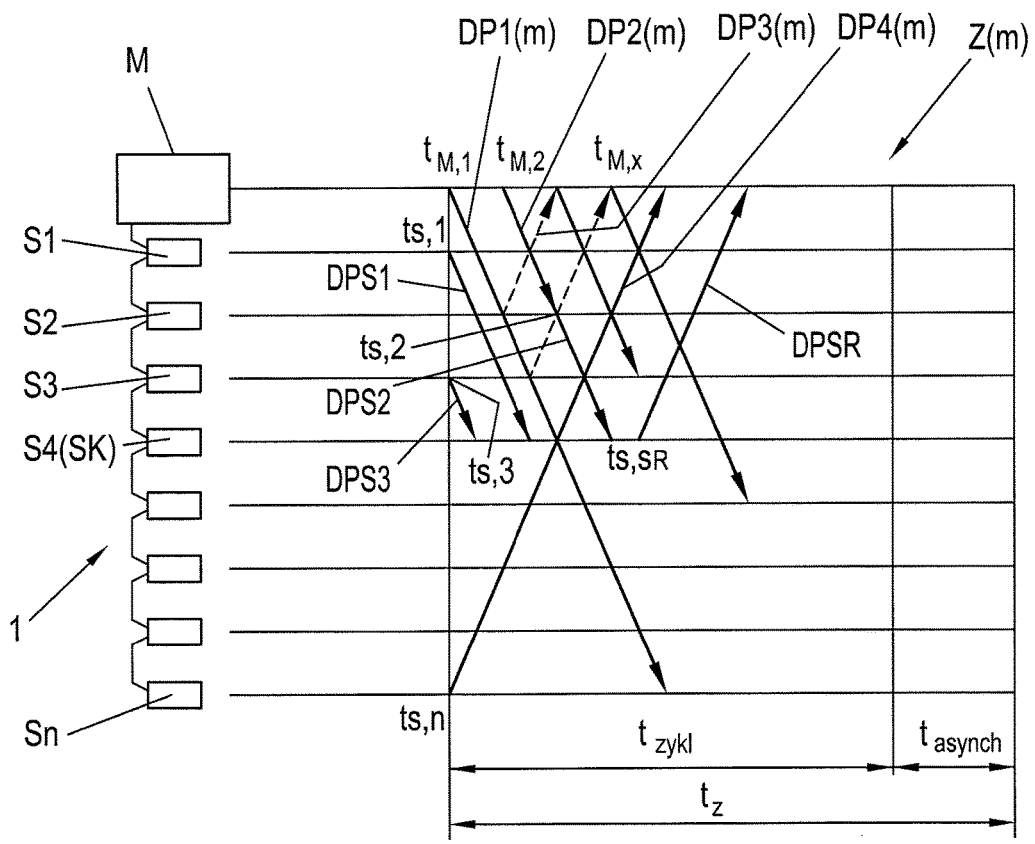
Figure 5:
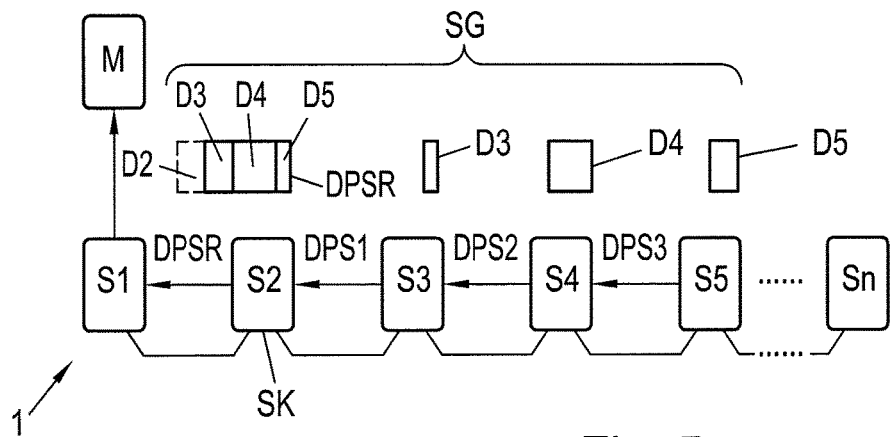
Figure 6:
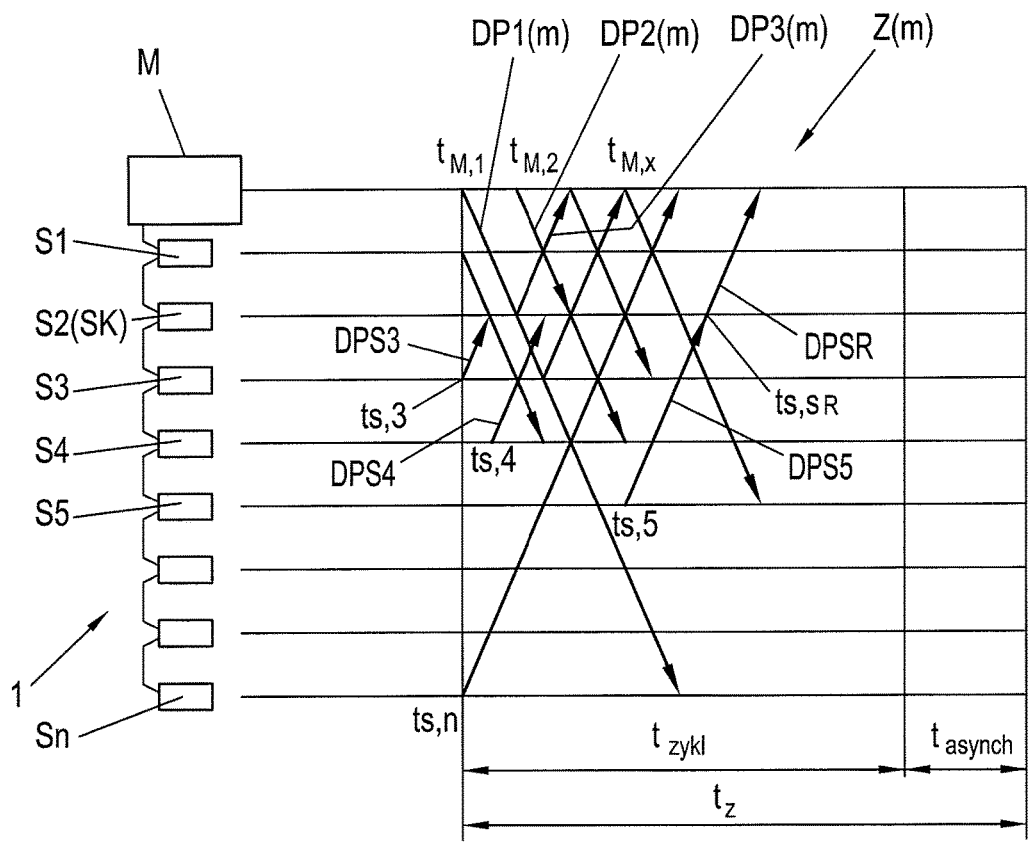
Figure 7:
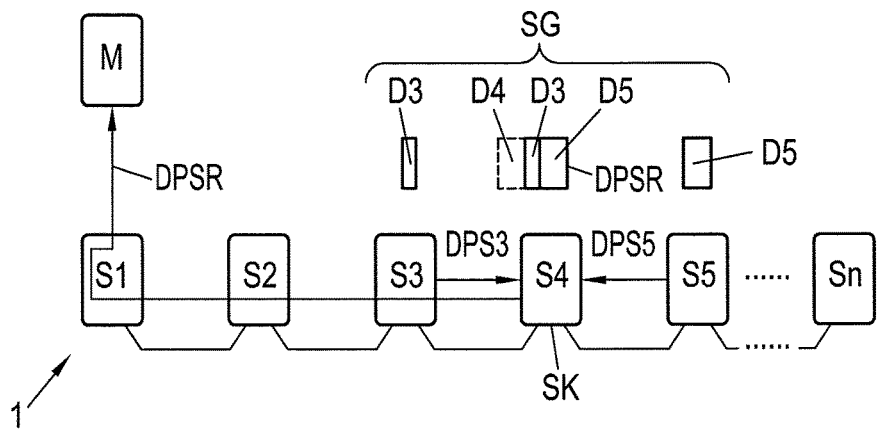
Figure 8:
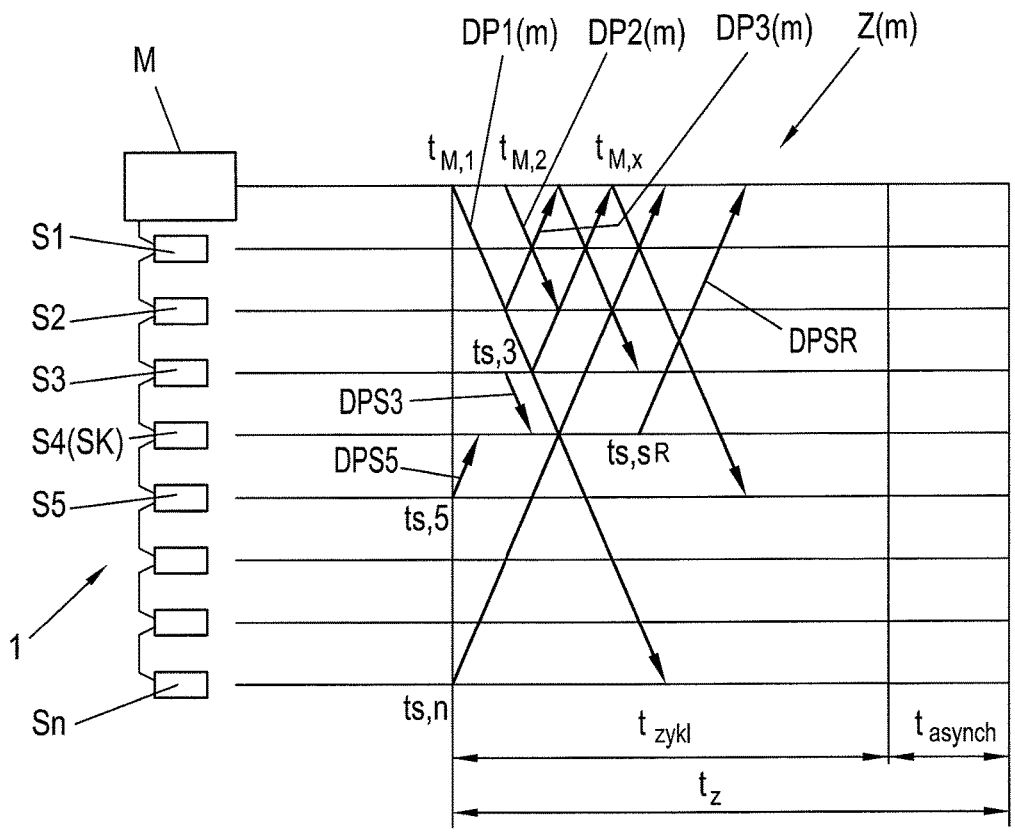

The present invention is explained in greater detail below with reference to FIGS. 1 to 8, which show by way of example, schematically and without limitation, advantageous embodiments of the invention. In the drawings:

FIGS. 1 and 2 show the communication on a real-time capable Ethernet data network, FIGS. 3 and 4 show a first implementation of the sum frame method according to the invention, FIGS. 5 and 6 show a further implementation of the sum frame method according to the invention, and FIGS. 7 and 8 show a further implementation of the sum frame method according to the invention.

A possible real-time capable Ethernet network protocol on which the invention is based is explained with reference to FIG. 1, wherein naturally other real-time capable Ethernet network protocols could also be used. For the description an example of a network topology is used in the form of a linear topology in which network nodes, in this case a master M with a number of series-connected slaves S1 . . . Sn, are connected to form a network. The slaves S1 . . . Sn here are embodied as network devices having an integrated 3-port switch (coupling element) that permits such a linear topology without external coupling elements. The master M is able to communicate in every transmit cycle Z, at prespecified cycle time $t_Z$, with every slave S1 . . . Sn, in that Ethernet data packets DP (hereinafter simply called data packets DP) are sent on the Ethernet data network 1. A sent data packet DP is indicated as an arrow in FIG. 1, wherein the arrow tip indicates the transmit direction (that is, from master M to a slave S or vice versa). Each horizontal line is assigned to a network node (master M or Slave S1 . . . Sn) and represents a timeline. The latency caused by the network when transmitting the data packets DP via the Ethernet data network 1 is indicated by the inclined arrows, wherein the processing period for the data packs DP into the coupling elements and the latency from the finite propagation speed in the medium (copper cable, fiber optics), combined and simplified, are assumed as constant.

A transmission cycle Z(m) is precisely temporally divided in that the times $t_{M,1}, t_{M,2}, \ldots, t_{M,x}, t_{S,1}, \ldots, t_{S,y}$ at which each network node, the master M or the slaves S1 ... Sn may send data packets DP are predefined. In this way it is possible to prevent data collisions on the data network 1 by scheduling the times. However, since Ethernet allows for a full-duplex data communication, it is possible that in a network section, data packets DP are transmitted simultaneously in both directions. This is how each of the subscribing network nodes (master M, slaves S) know the time within a transmit cycle Z at which they may send data packets DP, and when they are to receive some.

These times $t_{M,1}, t_{M,2}, \ldots, t_{M,x}, t_{S,1}, \ldots, t_{S,y}$ within the transmission cycle Z may be planned very precisely in advance if it is known how much data (bytes) are transmitted in each data packet DP. The larger the data packet DP to be expected, the further apart the times $t_{M,1}, t_{M,2}, \ldots, t_{M,x}, t_{S,1}, \ldots, t_{S,y}$. If the data size is not known in advance, a maximum data size may be assumed, e.g. the maximum frame size for an Ethernet frame. Between two data packets DP also a predetermined pause must be maintained at the data network 1.

The number of network nodes, masters (M) and slaves (S1 ... Sn), and the size of the sent data are therefore co-determinant for the attainable cycle time $t_Z$.

In FIG. 1, at the time $t_{M,1}$ the master M transmits a data packet DP1(m) to the last slave Sn in the transmission cycle Z(m). However, this data packet DP1(m) could also be a summation frame that contains data for all slaves S1 ... Sn (indicated in the transmission cycle Z(m+1)) and from which the slaves $S_1$ ... Sn read their data. At an established time $t_{M,2}$ thereafter, the master M transmits the next data packet DP2(m), in this case, e.g. to the slave S2. The slave S2 may also transmit a data packet DP3(m) to the master M at the same time. This principle is also maintained by the rest of the network nodes, wherein it is not necessary for every slave S1 ... Sn to receive or transmit a data packet DP. However, the communication is advantageously planned by the prespecification of the times $t_{M,1}, t_{M,2}, \ldots, t_{M,x}, t_{S,1}, \ldots, t_{S,y}$ such that the data packets DP from the slaves S1 ... Sn arrive at the master M successively and without a temporal gap (apart a pause that is to be maintained). This communication sequence then repeats itself in the subsequent transmission cycles Z(m+i), wherein the same network nodes do not always have to transmit or receive data packets DP in the same transmission cycle Z, as indicated in FIG. 1.

This planned data communication occurs cyclically and in each transmission cycle Z a temporal segment $t_{zykl}$ is provided for this isochronous data traffic. However, in each transmission cycle Z also a segment $t_{asynch}$ is reserved for asynchronous data traffic in which Ethernet data communication takes place which does not have to satisfy hard realtime requirements.

If the cyclical communication differs from transmission cycle to transmission cycle (as is indicated in FIG. 1 between Z(m) and Z(m+1), as an example), then there is at least a maximum periodic time (transmission cycle), within which the isochronous transmit patterns (not necessarily the data contents) repeat precisely, i.e. the cyclic data packets in Z(m) are identical to those in Z(m+a). In each individual transmission cycle Z, however, the ratio between $t_{zykl}$ and $t_{asynch}$ may change, depending on the number of planned cyclic data packets.

This communication principle of course also applies in other network topologies, as is described in FIG. 2 with the example of a star topology. In this case, a star topology is constructed by means of an external network switch SW, wherein a line topology as described in FIG. 1 is realized in each branch. The master M is also connected to the network switch SW. In the example shown, a data packet DP1(m) is transmitted, in the form a summation frame, to all slaves S1 ... Sn at time $t_M$ at the beginning of each transmission cycle Z. This data packet DP1(m) is forwarded by the network switch SW to the two branches and there is transmitted to all slaves S1 ... Sn. The other data packets DP are then retransmitted at times $t_{M,x}, t_{S,y}$ provided therefor within the transmission cycle Z(m). However, it must be kept in mind that the data packets DP that are returned to the master M by the slaves S1 ... Sn should preferably be planned such that no data jam can occur in the master M and in the network switch SW therebetween. The time for the data packet DP2(m) from the slave Sn to the master M should be planned, e.g. such that this data packet DP2(m) does not collide with other data packets from the other branch of the star topology, as shown in FIG. 2. For reasons of clarity, data packets DP moving back and forth between master M and network switch SW are depicted only partly in FIG. 2.

The method according to the invention for data communication in a real-time capable Ethernet data network will now be explained with reference to FIG. 3. In this case the real-time capable Ethernet data network 1 consists of a master network node M, a network switch SW and a plurality of slave network nodes S1, ..., Sn. Naturally, the network switch SW could be omitted and the master M could be directly connected to the first slave S1. A plurality of the slaves S1, ..., Sn, in this case the slaves S1, S2, S3, S4, is combined logically into a sum frame group SG for implementation of the sum frame method according to the invention.

An arbitrary slave S4 of the sum frame group SG is defined as collector node SK. All other slaves S1, S2, S3 of the sum frame group SG transmit their data D1, D2, D3, which they wish to transmit to the master M, in collective data packets DPS1, DPS2, DPS3 to the collector node SK. For this purpose, the slaves S1, S2, S3 of the sum frame group SG which transmit to the collector node SK merely have to be configured appropriately, so that the data are not transmitted to the master M, but to the collector node SK. Therefore the address inputs in the slaves S1, S2, S3 merely have to be configured appropriately in the address tables. Thus the collective data packets DPS1, DPS2, DPS3 correspond to the data packets which would normally be transmitted from the slaves S1, S2, S3 to the master M. These slaves S1, S2, S3 of the sum frame group SG can therefore be simple standard Ethernet network nodes. Only the collector node SK must have implemented the additional functionality of collecting the collective data packets DPS1, DPS2, DPS3 and producing and transmitting the sum frame data packet DPSR to the master M.

The collector node SK collects these data D1, D2, D3, which it receives with the collective data packets DPS1, DPS2, DPS3, and inserts them into a sum frame data packet DPSR, or generates a sum frame data packet DPSR therefrom. The collector node SK can also insert dedicated data D4 into the sum frame data packet DPSR, as indicated in FIG. 3. The collector node SK then transmits the finished sum frame data packet DPSR via the data network 1 to the master M.

The known overhead data of an Ethernet data packet such as the sum frame data packet DPSR, and any necessary padding data of the short data packets D1, D2, D3, are not shown in FIG. 3 for the sake of simplicity. However, the overhead data, and possibly data due to frame padding, of an Ethernet data packet are much less than the overhead data of many individual data packets from the slaves S1, S2, S3, S4 to the master M. Since now the overhead data for the sum frame data packet DPSR only have to be transmitted once, the cycle time $t_z$ of the transmission cycles can also be reduced, since in total less data are transmitted in the direction of the master M.

In the exemplary embodiment according to FIG. 3 the collector node SK is further away from the master M than the other slaves S1, S2, S3 of the sum frame group SG. Thus, during transmission to the master M, the sum frame data packet DPSR also reaches all other slaves S1, S2, S3 of the sum frame group SG. This has the advantage that in this way direct cross traffic between two slaves S1, S2, S3, S4 of the sum frame group can be implemented simultaneously, since the created sum frame data packet DPSR passes through all slaves S1, S2, S3 of the sum frame group SG on its way to the master M. So in this way two (or even more) slaves S1, S2, S3, S4 can exchange data directly with one another.

The arrangement of the collector node SK as far away as possible from the master, preferably furthest from the master M, has advantages in particular in a linear topology as shown in FIG. 3. In conventional real-time capable Ethernet network protocols the data traffic from the master M to the slave Sx is less than from the slave Sx to the master M. If the collector node SK is arranged in the vicinity of the master M, then the collective data packet DPSx of the slaves Sx (with the respective overhead data) occupy the data network and there would be little or no benefit from the sum frame data packet DPSR. The nearer the collector node SK is to the master M, the less benefit can be expected. On the other hand, of the collector node SK is further away from the master M than the (or at least several of the) slaves S1, S2, S3 of the sum frame group SG, then the higher available bandwidth can be utilized by the master M in the direction of the slaves Sx in order to transmit the collective data packets DPS1, DPS2, DPS3 therein. Thus in the direction from the master M to the slave Sx bandwidth is "given away" which is not usually needed in any case, in order to save cycle time in the direction from the slave Sx to the master M.

FIG. 4 again shows the data packet traffic over the data network 1 (without the network switch SW for the sake of simplicity). As already described, the data traffic on the real-time capable Ethernet data network 1 is planned precisely in terms of time. Thus the collective data packets DPS1, DPS2, DPS3 must likewise be planned precisely in terms of time and implemented in addition to the conventional data traffic. At the times $t_{S,1}$, $t_{S,2}$, $t_{S,3}$ of a transmission cycle Z(m) it is provided that slaves S1, S2, S3 of the sum frame group SG transmit their data D1, D2, D3 to the collector node SK. At the time $t_{S,SR}$, after the collector node SK has received all expected data D1, D2, D3 and after the collector node SK has created the sum frame data packet DPSR, the collector node SK transmits the sum frame data packet DPSR to the master M.

The directly data communication of a slave S2, S3 of the sum frame group SG to the master M by means of direct addressing may also be superfluous with the sum frame data packet DPSR. Thus the data packets DP3 and DP4 of the slaves S2, S3 could be spared, as indicated by broken lines in FIG. 4.

FIGS. 5 and 6 show another exemplary embodiment of the invention. Here the collector node SK of the slave S2 of the sum frame group SG is nearest to the master M in the data network 1. From the slaves S3, S4, S5 of the sum frame group SG lying behind it (i.e. further away from the master M) the collector node SK receives the collective data packets DPS3, DPS4, DPS5 of the slaves S3, S4, S5, which again are sent at the predetermined times $t_{S,3}$, $t_{S,4}$, $t_{S,5}$ of transmission cycle Z(m) (FIG. 6). At the time $t_{S,SR}$, after the collector node SK has received all expected data D3, D4, D5 and after the collector node SK has created the sum frame data packet DPSR (possibly with its own data D2), the collector node SK transmits the sum frame data packet DPSR to the master M. Although in this case the advantage described above of the sum frame data packet DPSR is lessened, this arrangement has another advantage, namely that it makes it possible also to operate with different data rates of the slaves S1, S2, S3, S4 of the sum frame group SG. The slaves S3, S4, S5 which from the perspective of the master M lie behind the collector node SK can have a lower data rate (for example 100 Mbit) than the collector node SK (for example 1 Gbit). The fast collector node SK can then transmit the sum frame data packet DPSR with the high data rate via the data network (for example in a tree topology).

In a further embodiment of the invention according to FIGS. 7 and 8 a sum frame group SG consisting of a plurality of slaves S3, S4, S5 is again provided, wherein here the collector node SK (slave S4) is arranged somewhere in the middle of the slaves S3, S4, S5 of the sum frame group SG. As a result, the collector node SK receives the collective data packets DPS3, DPS5 from both sides of the data network 1. Otherwise the sequence is exactly the same. At the time $t_{S,SR}$, (FIG. 8) after the collector node SK has received all expected data D3, D5 and after the collector node SK has created the sum frame data packet DPSR (possibly with its own data D4), the collector node SK transmits the sum frame data packet DPSR to the master M.

It should be noted that the slave S1, S2, S3, S4, S5 of a sum frame group SG on the data network 1 do not have to be arranged immediately behind one another or in a row, such as in the illustrated exemplary embodiments.

In principle it would even be possible also to distribute the transmission of a sum frame data packet DPSR over a plurality of transmission cycles $t_z$. For this purpose, the collector node SK can collect the collective data packets DPS1, DPS2, DPS3 over a plurality of transmission cycles $t_z$ and, after the arrival of all collective data packet DPS1, DPS2, DPS3, can transmit the sum frame data packet DPSR.

However, the fact that the sum frame data packet DPSR is only created at one point (in the collector node SK), and is then transmitted unchanged via the data network 1, has a further advantage. An Ethernet data packet is generally secured by redundancy data, such as for example a cyclic redundancy code (CRC), against transmission errors. If the sum frame data packet DPSR were changed during transmission by different network nodes, because for example network nodes remove or add data, then each network node would have to secure the transmitted data packet individually with redundancy data, since otherwise at the receiving end it would not be possible to ascertain which data have been corrupted. The reason for this is that before transmission of a data packet DP each network node automatically calculates new Ethernet redundancy data calculated and inserts them into the Ethernet data packet. Even if a bit drops out and the Ethernet redundancy data do not match at one point, these are correctly calculated and overwritten by the next network node and then it is no longer possible to ascertain that the data packet DP is actually corrupt. The error may be in the header or in the data, which cannot be ascertained. Consequently, the complete sum frame data packet DPSR would have to be discarded and the repeated transmission of the sum frame data packet DPSR would have to be initiated. In addition to that there is also the cost of computing power and space in the sum frame. This would be a problem, or even unacceptable, in particular in a real-time capable Ethernet network protocol, because the necessary cycle times could no longer be maintained. In the sum frame method according to the invention with the collector node SK it is sufficient to incorporate an additional bit into the sum frame data packet DPSR per slave S1, S2, S3, S4 of the sum frame group SG, said bit indicating whether the data D1, D2, D3, D4 have arrived at the collector node SK and are valid. As a result, the additional overhead can be kept very small in the sum frame data packet DPSR. The collector node SK creates the sum frame data packet DPSR and calculates the Ethernet redundancy data for this Ethernet data packet. The master M can examine the Ethernet redundancy data and the additional bits.

When everything matches, the master M can assume that the sum frame data packet DPSR is correct and error-free. If the Ethernet redundancy data do not match, the sum frame data packet DPSR must be discarded. If an additional bit is not set for a slave S1, S2, S3, S4, if the Ethernet redundancy data are correct the master M can use the data of all the other slaves, but solely not from the one slave for which the additional bit is not set.

The invention claimed is:

1. A method for data communication in a real-time capable Ethernet data network, in which at least one master is connected via an Ethernet data network to a plurality of slaves and data in the form of data packets are transmitted between the master and the slaves, the method comprising:
   combining at least some of the plurality of slaves into a sum frame group and a slave of the sum frame group is specified as a collector node and all other slaves of the sum frame group transmit their data in each case with a collective data packet to the collector node,
   wherein the collector node inserts the data of the other slaves of the sum frame group into a sum frame data packet and the collector node transmits the sum frame data packet to the master.

2. The method according to claim 1, wherein a slave of the sum frame group which is furthest away from the master on the data network is selected as the collector node.

3. The method according to claim 1, wherein a slave of the sum frame group which is arranged nearest to the master on the data network is selected as the collector node.

4. The method according to claim 1, wherein a slave in a middle of the sum frame group is selected as the collector node.

5. The method according to claim 1, wherein for each slave of the sum frame group transmitting to the collector node a bit which indicates whether the data have been validly received from the collector node is contained in the sum frame data packet.

* * * * *